(12) United States Patent
Ono et al.

(10) Patent No.: US 10,622,148 B2
(45) Date of Patent: Apr. 14, 2020

(54) MULTI-LAYER CERAMIC CAPACITOR

(71) Applicant: Taiyo Yuden Co., Ltd., Tokyo (JP)

(72) Inventors: Ryo Ono, Tokyo (JP); Tetsuhiko Fukuoka, Tokyo (JP); Shoji Kusumoto, Tokyo (JP); Akihiko Kono, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/239,206

(22) Filed: Jan. 3, 2019

(65) Prior Publication Data

US 2019/0221368 A1    Jul. 18, 2019

(30) Foreign Application Priority Data

Jan. 17, 2018  (JP) .................................. 2018-005440

(51) Int. Cl.
| | |
|---|---|
| *H01G 4/30* | (2006.01) |
| *H01G 4/224* | (2006.01) |
| *H01G 4/012* | (2006.01) |
| *H01G 4/12* | (2006.01) |
| *H01G 4/232* | (2006.01) |
| *H01G 4/248* | (2006.01) |

(52) U.S. Cl.
CPC ............. *H01G 4/224* (2013.01); *H01G 4/012* (2013.01); *H01G 4/30* (2013.01); *H01G 4/1227* (2013.01); *H01G 4/1236* (2013.01); *H01G 4/232* (2013.01); *H01G 4/248* (2013.01)

(58) Field of Classification Search
CPC .......... H01G 4/005; H01G 4/06; H01G 4/008; H01G 4/012; H01G 4/12; H01G 4/30; H01G 4/232; H01G 4/248; H01G 4/1227
See application file for complete search history.

(56) References Cited

U.S. PATENT DOCUMENTS

| | | | |
|---|---|---|---|
| 2012/0234462 A1 | 9/2012 | Matsui et al. | |
| 2012/0313489 A1* | 12/2012 | Shirakawa | ............... H01G 4/30 310/365 |
| 2013/0340920 A1 | 12/2013 | Matsui et al. | |
| 2014/0345779 A1 | 11/2014 | Matsui et al. | |

(Continued)

FOREIGN PATENT DOCUMENTS

JP          2012-209539 A     10/2012

*Primary Examiner* — Nguyen T Ha
(74) *Attorney, Agent, or Firm* — Saliwanchik, Lloyd & Eisenschenk

(57) ABSTRACT

A multi-layer ceramic capacitor includes: a multi-layer unit including a capacitance forming unit including internal electrodes laminated in a first direction, a drawn portion extending from the capacitance forming unit in a second direction, and a cover that covers the capacitance forming unit and the drawn portion in the first direction, the multi-layer unit having a main surface facing in the first direction, an end surface facing in the second direction, and a side surface facing in a third direction; and a side margin provided to the side surface, the side surface including a first straight portion including an outer edge of the main surface and extending in the second direction, a second straight portion including an outer edge of the end surface and extending in the first direction, and a corner portion that connects the first and second straight portions with each other, the corner portion being curved.

3 Claims, 12 Drawing Sheets

(56) References Cited

U.S. PATENT DOCUMENTS

| | | | |
|---|---|---|---|
| 2014/0362492 A1* | 12/2014 | Lee | H01G 4/30 361/301.4 |
| 2015/0116896 A1* | 4/2015 | Inazuka | H01G 4/1227 361/301.4 |
| 2015/0340155 A1* | 11/2015 | Fukunaga | H01G 4/012 361/301.4 |
| 2016/0284471 A1* | 9/2016 | Mizuno | H01G 4/232 |
| 2017/0018363 A1* | 1/2017 | Tanaka | H01G 4/005 |
| 2017/0243697 A1* | 8/2017 | Mizuno | H01G 4/308 |

* cited by examiner

MULTI-LAYER CERAMIC CAPACITOR

CROSS-REFERENCE TO RELATED APPLICATION

This application claims the benefit under 35 U.S.C. § 119 of Japanese Application No. 2018-005440, filed Jan. 17, 2018, which is hereby incorporated in its entirety.

BACKGROUND

The present disclosure relates to a multi-layer ceramic capacitor including side margins.

In recent years, along with miniaturization of electronic devices and achievement of high performance thereof, there have been increasingly strong demands for miniaturization and increase in capacitance with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Therefore, in such a method of producing a multi-layer ceramic capacitor, as the side margins are made thinner, it is more difficult to ensure insulation properties of the periphery of the internal electrodes.

Japanese Patent Application Laid-open No. 2012-209539 discloses a technique of providing side margins in a later step. In other words, in this technique, in a green chip in which internal electrodes are exposed at the side surfaces, a side surface of the green chip is pressed against a ceramic green sheet. In such a manner, the ceramic green sheet for side surfaces is punched, and ceramic protective layers (side margins) are thus provided. This technique enables side margins having a uniform thickness to be formed and thus enables insulation properties of the periphery of the internal electrodes to be ensured also when the side margins are made thin.

SUMMARY

Meanwhile, as described in Japanese Patent Application Laid-open No. 2012-209539, the following case has occurred: when the side surface of the green chip is pressed against the ceramic green sheet for side surfaces, the ceramic green sheet is turned up and adheres to a surface other than the side surface of the green chip; meanwhile, the ceramic green sheet is not sufficiently punched, and the side margin cannot be formed.

In view of the circumstances as described above, it is desirable to provide a multi-layer ceramic capacitor including side margins each having an appropriate shape.

According to an embodiment of the present disclosure, there is provided a multi-layer ceramic capacitor including a multi-layer unit and a side margin.

The multi-layer unit includes a capacitance forming unit, a drawn portion, and a cover.

The capacitance forming unit includes internal electrodes laminated in a first direction.

The drawn portion extends from the capacitance forming unit in a second direction orthogonal to the first direction, the internal electrodes being drawn in the drawn portion.

The cover covers the capacitance forming unit and the drawn portion in the first direction.

The multi-layer unit has a main surface facing in the first direction, an end surface facing in the second direction, and a side surface facing in a third direction orthogonal to the first direction and the second direction.

The side margin is provided to the side surface.

The side surface includes a first straight portion that includes an outer edge of the main surface and extends in the second direction, a second straight portion that includes an outer edge of the end surface and extends in the first direction, and a corner portion that connects the first straight portion and the second straight portion with each other.

The corner portion is curved to satisfy conditions where $0.4 \leq a/b \leq 2.5$, and 10 μm$\leq a$, $b \leq 60$ where a represents a distance along the first direction between a first imaginary line extended from the first straight portion in the second direction and an endpoint of the second straight portion on a side of the first imaginary line, and b represents a distance along the second direction between a second imaginary line extended from the second straight portion in the first direction and an end portion of the drawn portion, the end portion being exposed from the side surface and positioned at a boundary between the capacitance forming unit and the cover.

With this configuration, the side surface of the multi-layer unit, on which the side margin is to be formed, is configured to have a rectangular shape with rounded corners. With the corner portion satisfying the conditions described above, the load to be applied to the ceramic sheet can be dispersed, and a shear force with an appropriate magnitude can be caused to act thereon when a ceramic sheet for forming side margins is punched to form side margins. Accordingly, it is possible to punch the ceramic sheet into a shape along the outer edge of the side surface and provide a side margin with an appropriate shape.

The corner portion may be curved to further satisfy a condition where $0.5 \leq a/b \leq 1.5$.

This can effectively suppress the concentration of the shear force at the vicinity of the corner portion of the ceramic sheet and reliably inhibit appearance defects of the side margin from occurring.

The corner portion may be curved to further satisfy conditions where $1.0 \leq a/b \leq 1.5$, and 10 μm$\leq b \leq 30$ μm.

This can cause a shear force with an appropriate magnitude to act on the ceramic sheet even when the length dimension of the drawn portion along the second direction is shortened. Therefore, it is possible to increase the proportion of the capacitance forming unit in the multi-layer ceramic capacitor and achieve a small size and increase in capacitance, and to provide a side margin with an appropriate shape.

As described above, according to the present disclosure, it is possible to provide a multi-layer ceramic capacitor including side margins each having an appropriate shape.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
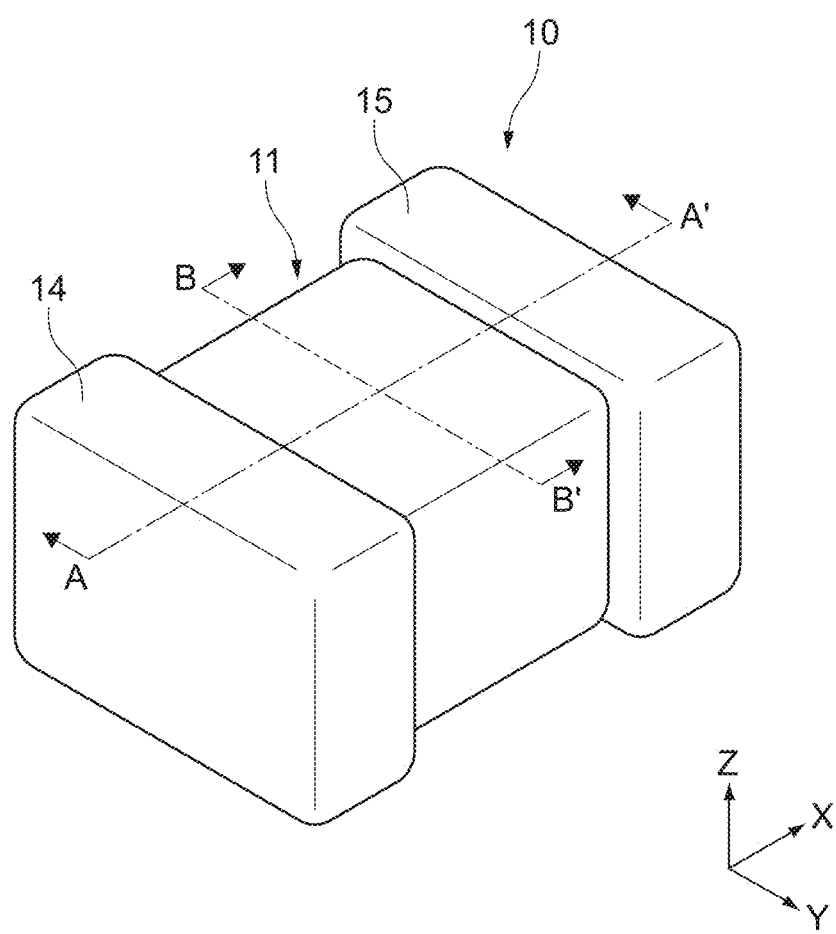
FIG. 1 is a perspective view of a multi-layer ceramic capacitor according to an embodiment of the present disclosure.
Figure 2:
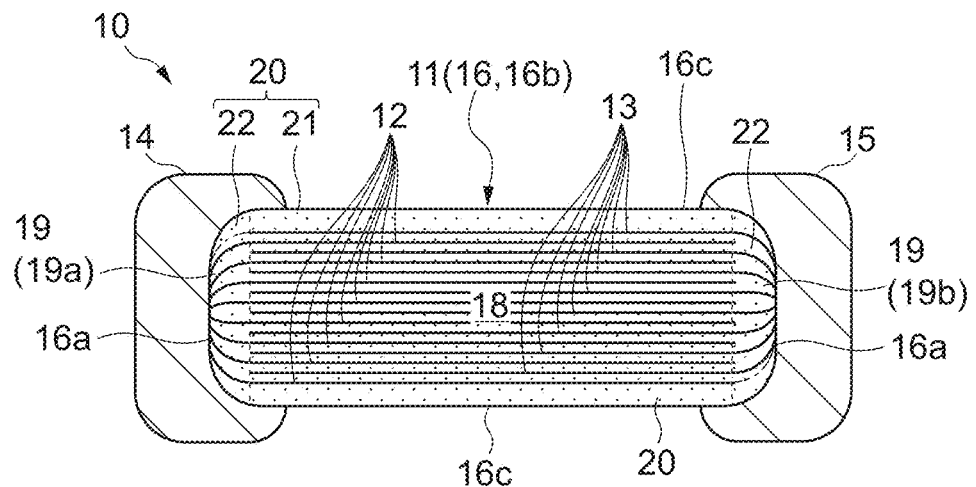
FIG. 2 is a cross-sectional view of the multi-layer ceramic capacitor taken along the A-A' line in FIG. 1.
Figure 3:
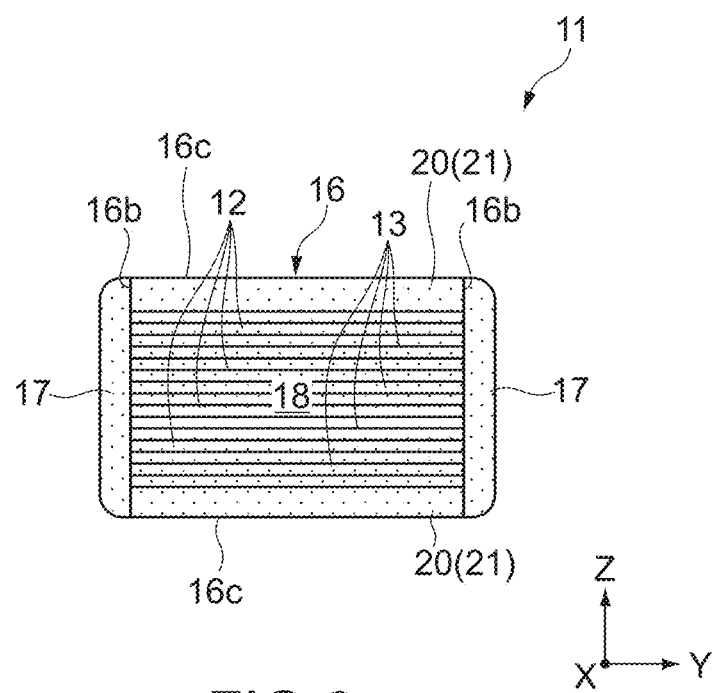
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two main surfaces facing in the Z-axis direction, two end surfaces facing in the X-axis direction, and two side surfaces facing in the Y-axis direction. It should be noted that ridges connecting the respective surfaces of the ceramic body 11 are rounded.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane. It should be noted that the shapes of the first external electrode 14 and the second external electrode 15 are not limited to those shown in FIG. 1.

The first and second external electrodes 14 and 15 are each made of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is made of dielectric ceramics and includes a multi-layer unit 16 and side margins 17. The multi-layer unit 16 has two end surfaces 16a facing in the X-axis direction, two side surfaces 16b facing in the Y-axis direction, and two main surfaces 16c facing in the Z-axis direction. The side margins 17 cover the two side surfaces 16b of the multi-layer unit 16.

It should be noted that the cross section shown in FIG. 2 corresponds to the side surface 16b of the multi-layer unit 16.

The multi-layer unit 16 has a configuration in which a plurality of flat plate-like ceramic layers extending along the X-Y plane are laminated in the Z-axis direction. The multi-layer unit 16 includes a capacitance forming unit 18, two drawn portions 19, and two covers 20. The drawn portions 19 are provided to both sides of the capacitance forming unit 18 in the X-axis direction. The drawn portions 19 configure, together with the covers 20, the end surfaces 16a connected to the first external electrode 14 and the second external electrode 15.

The covers 20 cover the capacitance forming unit 18 and the drawn portions 19 vertically in the Z-axis direction. The surfaces of the covers 20 that face in the Z-axis direction constitute the two main surfaces 16c of the multi-layer unit 16. Each of the covers 20 includes a first cover region 21 and second cover regions 22. The first cover regions 21 of the covers 20 cover the top and the bottom of the capacitance forming unit 18 in the Z-axis direction. The second cover regions 22 of the covers 20 cover the top and the bottom of the drawn portions 19 in the Z-axis direction. It should be noted that each of the main surfaces 16c of the first cover regions 21 includes a flat region 16d (see FIG. 13).

The capacitance forming unit 18 includes a plurality of first internal electrodes 12 and a plurality of second internal electrodes 13. The first and second internal electrodes 12 and 13 each have a sheet-like shape extending along the X-Y plane. In the capacitance forming unit 18, the first and second internal electrodes 12 and 13 are alternately laminated in the Z-axis direction while sandwiching a plurality of ceramic layers therebetween. In other words, the first internal electrode 12 and the second internal electrode 13 face each other in the Z-axis direction while sandwiching the ceramic layer therebetween. The capacitance forming unit 18 has a function of storing charge in the multi-layer ceramic capacitor 10.

The first and second internal electrodes 12 and 13 are formed over the entire width of the capacitance forming unit 18 in the Y-axis direction and are exposed at both the side surfaces 16b of the multi-layer unit 16. In the ceramic body 11, the side margins 17 that cover both the side surfaces 16b of the multi-layer unit 16 ensure insulation properties between the first internal electrodes 12 and the second internal electrodes 13, which are adjacent to each other, in both the side surfaces 16b of the multi-layer unit 16.

Out of the drawn portions 19, in a first drawn portion 19a, the first internal electrodes 12 extend outward in the X-axis direction from the capacitance forming unit 18 to the end surface 16a that comes into contact with the first external electrode 14. In a second drawn portion 19b, the second internal electrodes 13 extend outward in the X-axis direction from the capacitance forming unit 18 to the end surface 16a that comes into contact with the second external electrode 15. With this configuration, the first internal electrodes 12 are connected to the first external electrode 14, and the second internal electrodes 13 are connected to the second external electrode 15.

The ceramic layers between the first internal electrodes 12 in the first drawn portion 19a function as an end margin that ensures insulation properties between the second internal electrodes 13 and the first external electrode 14. Similarly, the ceramic layers between the second internal electrodes 13 in the second drawn portion 19b function as an end margin that ensures insulation properties between the first internal electrodes 12 and the second external electrode 15.

With such a condiguration, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Thus, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each made of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the configuration of the multi-layer ceramic capacitor 10 according to this embodiment is not limited to the configuration shown in FIGS. 1 to 3. For example, the number of first and second internal electrodes 12 and 13 can be determined as appropriate according to the size and performance expected for the multi-layer ceramic capacitor 10.

As shown in FIG. 2, the main surfaces 16c in the second cover region 22 are curved inward in the Z-axis direction. Along with this curve, the drawn portion 19 is also configured such that the height dimension thereof in the Z-axis direction gradually decreases from the capacitance forming unit 18 toward the end surface 16a. The first and second internal electrodes 12 and 13 in the drawn portion 19 are also disposed to be curved inward in the Z-axis direction toward the end surfaces 16a. For example, the height dimension of the drawn portion 19 along the Z-axis direction at the end surface 16a is equal to or less than eight tenths of the height dimension of the drawn portion 19 along the Z-axis direction at a boundary with the capacitance forming unit 18.

With this configuration, each side surface 16b has a rectangular shape with rounded corners.

The multi-layer ceramic capacitor 10 having the configuration described above is formed by the following production method.

2. Method of Producing Multi-Layer Ceramic Capacitor 10

Figure 4:
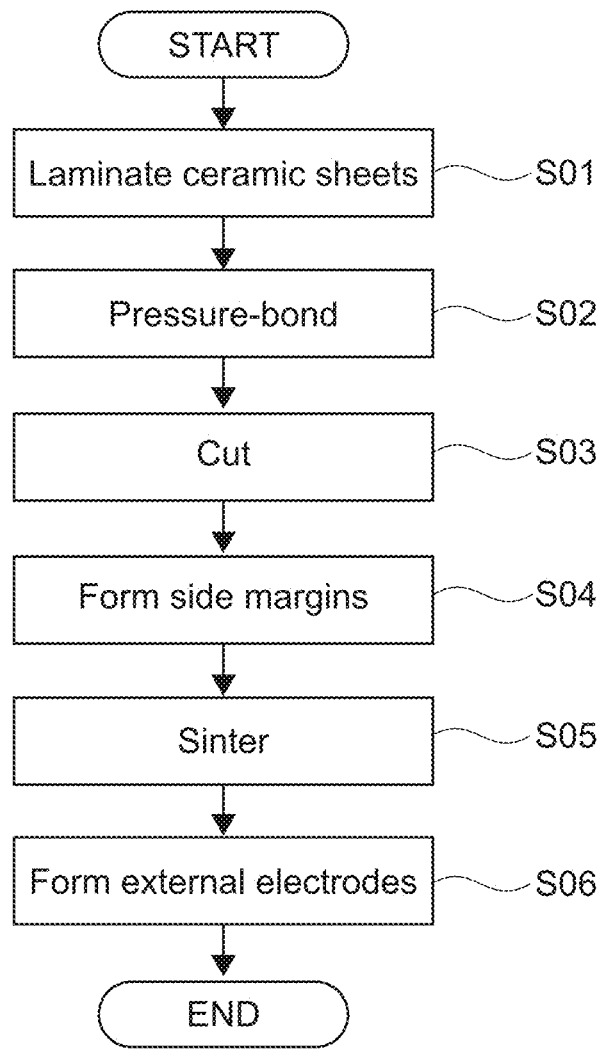
FIG. 4 is a flowchart showing a method of producing the multi-layer ceramic capacitor.
Figure 5:
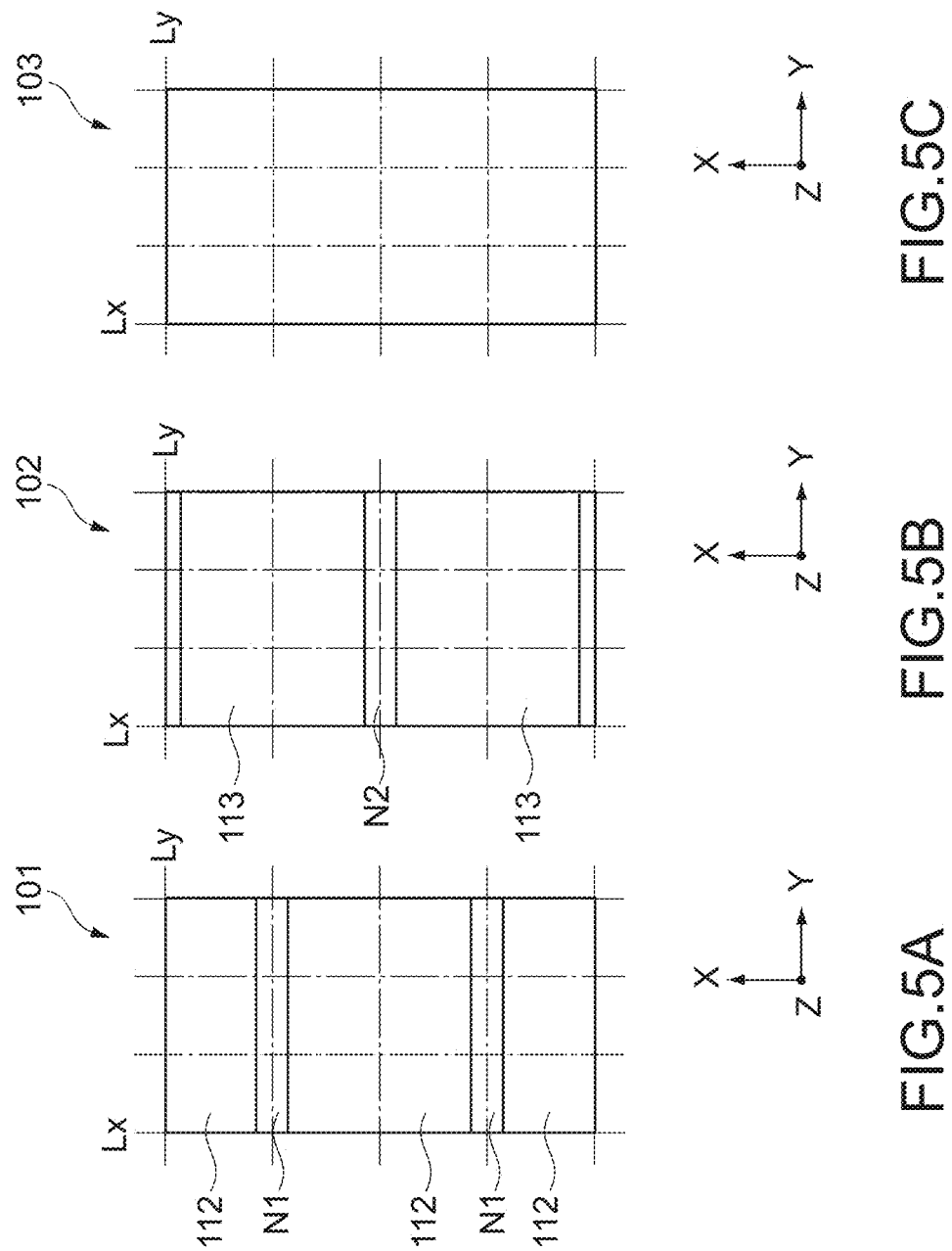
FIGS. 5A, 5B, and 5C are each a plan view showing a production process of the multi-layer ceramic capacitor.

FIG. 4 is a flowchart showing a method of producing the multi-layer ceramic capacitor 10. FIGS. 5A to 12 are views each schematically showing a production process of the multi-layer ceramic capacitor 10. Hereinafter, the method of producing the multi-layer ceramic capacitor 10 will be described along FIG. 4 with reference to FIGS. 5A to 12 as appropriate.

2.1 Step S01: Lamination of Ceramic Sheets

In Step S01, first ceramic sheets 101 and second ceramic sheets 102 for forming the capacitance forming unit 18, and third ceramic sheets 103 for forming the covers 20 are prepared and then laminated.

The first, second, and third ceramic sheets 101, 102, and 103 are configured as unsintered dielectric green sheets mainly containing dielectric ceramics. The first, second, and third ceramic sheets 101, 102, and 103 are each formed into a sheet shape by using a roll coater or a doctor blade, for example. The thickness of each of the first, second, and third ceramic sheets 101, 102, and 103 is adjustable as appropriate.

FIGS. 5A, 5B, and 5C are plan views of the first, second, and third ceramic sheets 101, 102, and 103, respectively. At this stage, the first, second, and third ceramic sheets 101, 102, and 103 are each configured as a large-sized sheet that is not singulated. FIGS. 5A, 5B, and 5C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 20.

The first internal electrodes 112 and the second internal electrodes 113 can be formed by applying an optional electrically conductive paste to the first ceramic sheets 101 and the second ceramic sheets 102, respectively. A method of applying the electrically conductive paste can be optionally selected from well-known techniques. For example, for the application of the electrically conductive paste, a screen printing method or a gravure printing method can be used.

On the first ceramic sheet 101, electrode non-formation regions N1 in which the first internal electrodes 112 are not applied are formed in a belt-like shape along the cutting lines Ly. Similarly, on the second ceramic sheet 102, electrode non-formation region N2 in which the second internal electrodes 113 are not applied are formed in a belt-like shape along the cutting lines Ly. The electrode non-formation regions N1 and the electrode non-formation regions N2 are alternately disposed in the X-axis direction. In other words, the cutting lines Ly passing through the electrode non-formation regions N1 and the cutting lines Ly passing through the electrode non-formation regions N2 are alternately disposed.

Figure 6:
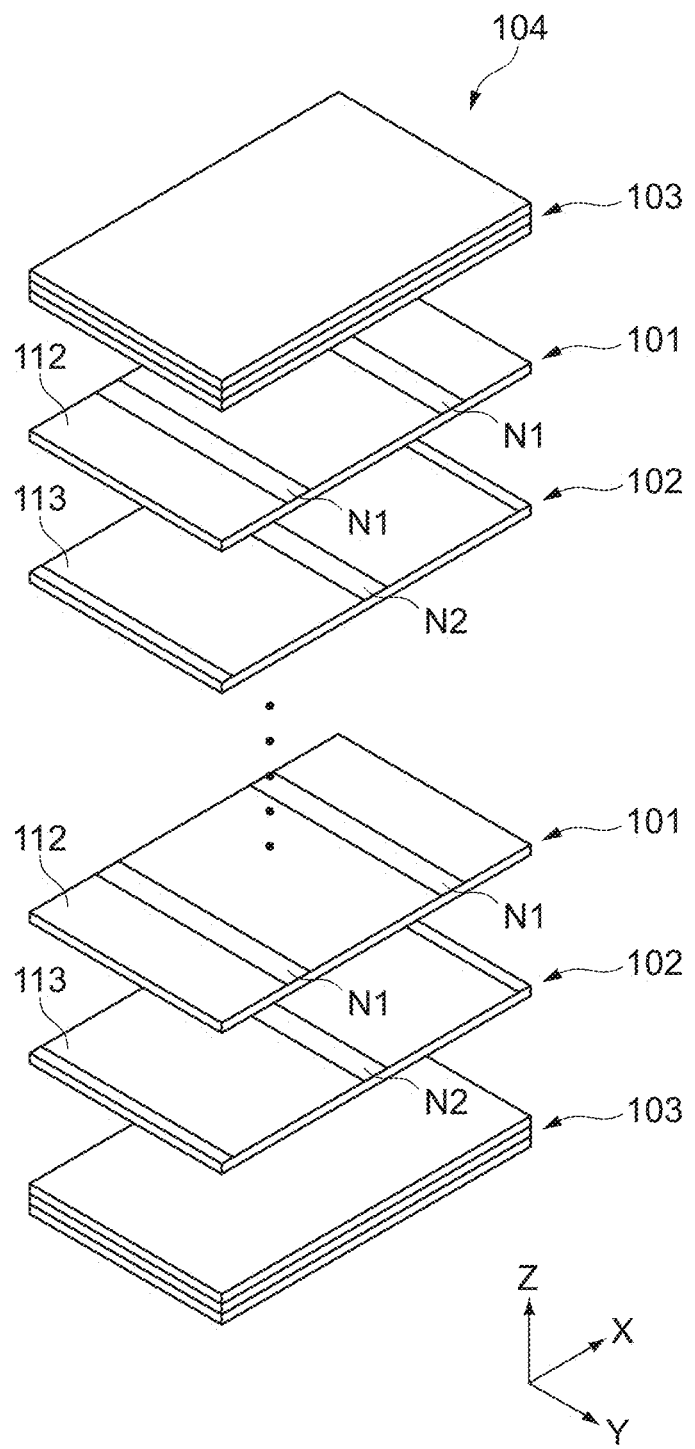
FIG. 6 is a perspective view showing a production process of the multi-layer ceramic capacitor.

Those first, second, and third ceramic sheets 101, 102, and 103 are laminated as shown in FIG. 6, to produce a multi-layer sheet 104. In other words, the first ceramic sheets 101 and the second ceramic sheets 102 are alternately laminated, and the third ceramic sheets 103 are laminated on the upper and lower surfaces of the laminate of those first and second ceramic sheets 101 and 102 in the Z-axis direction. In the electrode non-formation regions N1 of the multi-layer sheet 104, the second internal electrodes 113 are laminated, and in the electrode non-formation regions N2 of the multi-layer sheet 104, the first internal electrodes 112 are laminated. It should be noted that the example of FIG. 6 shows the third ceramic sheets 103 each including three sheets laminated, but the number of third ceramic sheets 103 can be changed as appropriate.

2.2 Step S02: Pressure-Bonding

In Step S02, the multi-layer sheet 104 is subjected to pressure-bonding in the Z-axis direction.

Figure 7:
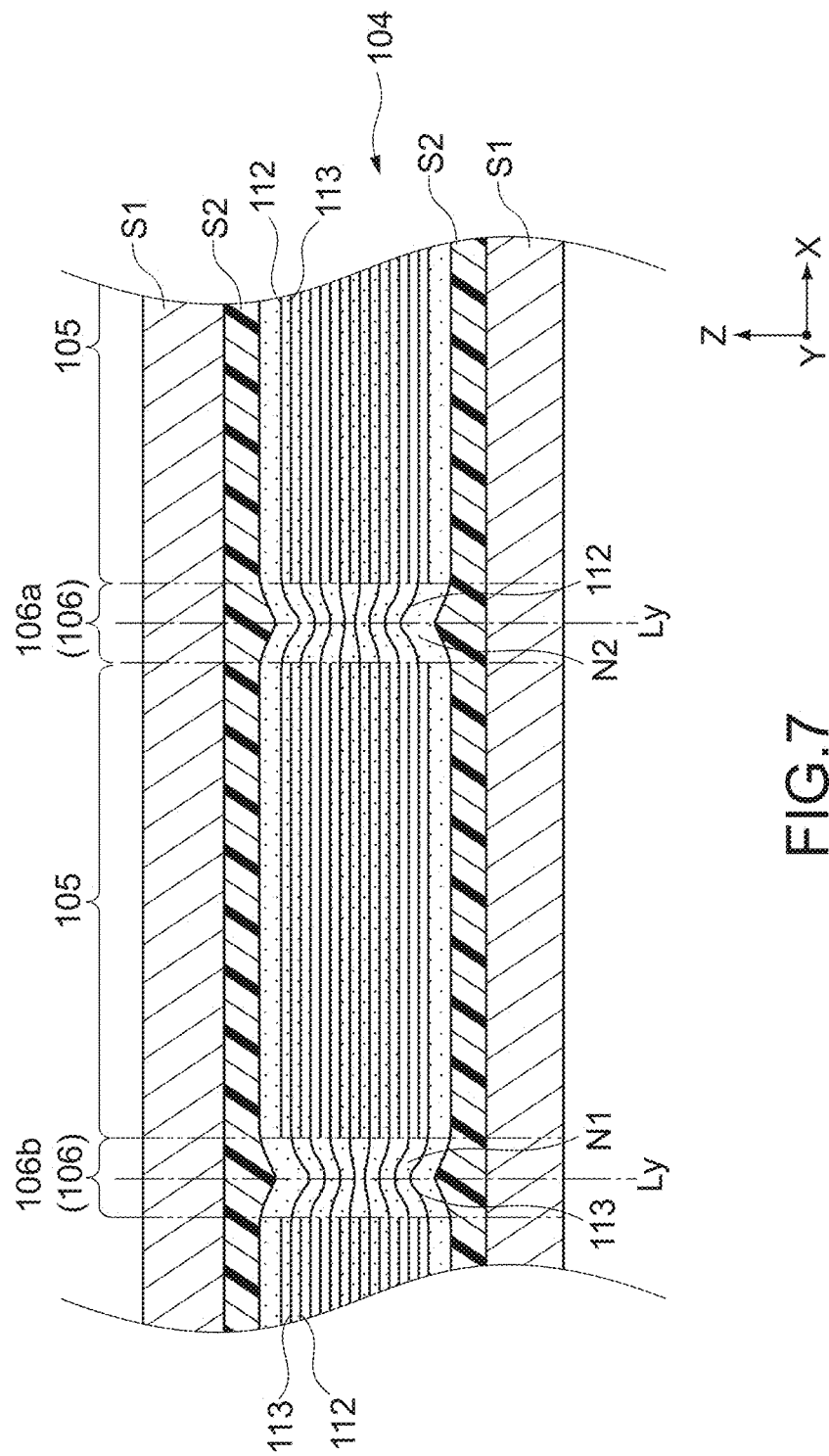
FIG. 7 is a cross-sectional view showing a production process of the multi-layer ceramic capacitor.

FIG. 7 is a schematic cross-sectional view for describing a pressure-bonding process of Step S02 when viewed in the Y-axis direction.

In the pressure-bonding process of this step, pressurizing plates S1 as a pair are caused to face each other so as to sandwich the multi-layer sheet 104 therebetween in the Z-axis direction and are pressurized toward the multi-layer sheet 104, to pressure-bond the multi-layer sheet 104. The pressurizing plates S1 are pressurized by, for example, hydrostatic pressing or uniaxial pressing.

Moreover, elastic sheets S2 are disposed between the pressurizing plates S1 and the multi-layer sheet 104. The elastic sheets S2 are each formed by a sheet-like elastic body and is made of, for example, a polyethylene terephthalate (PET) resin. The elastic sheets S2 are pressurized by the pressurizing plates S1 toward the multi-layer sheet 104.

Here, the multi-layer sheet 104 includes a capacitance forming region 105, a first drawn region 106a, and a second drawn region 106b. In the capacitance forming region 105, the first and second internal electrodes 112 and 113 are laminated. In the first drawn region 106a, the first internal electrodes 112 and the electrode non-formation regions N2 are laminated. In the second drawn region 106b, the second internal electrodes 113 and the electrode non-formation regions N1 are laminated. The capacitance forming region 105 corresponds to the capacitance forming unit 18 and the first cover region 21 of the cover 20. The first drawn region 106a corresponds to the first drawn portion 19a and the second cover region 22 of the cover 20. The second drawn region 106b corresponds to the second drawn portion 19b and the second cover region 22 of the cover 20. The first drawn region 106a and the second drawn region 106b are collectively referred to as drawn regions 106.

Such a multi-layer sheet 104 is pressurized via the elastic sheets S2, and thus the drawn regions 106 having the shape sinking inward in the Z-axis direction can be formed as will be described below.

The capacitance forming region 105 includes the first and second internal electrodes 112 and 113 and includes the first, second, and third ceramic sheets 101, 102, and 103 laminated without space therebetween. With this configuration, the entire capacitance forming region 105 is stretched in the X-Y plane by the pressure-bonding process and is almost uniformly compressed. As a result, a substantially flat surface is formed in the capacitance forming region 105.

Meanwhile, in the drawn regions 106 before pressurizing, gaps corresponding to the electrode non-formation regions N1 and N2 are formed. Further, the green sheets are softer and more likely to be stretched than the first and second internal electrodes 112 and 113. Thus, the green sheets stretched from the capacitance forming region 105 get into the gaps by pressurizing.

Moreover, the elastic sheets S2 can sufficiently apply, by elastic deformation, a load also to the drawn regions 106 each having a small thickness. With this configuration, in the drawn regions 106, the green sheets stretched from the capacitance forming region 105 and the green sheets laminated before pressurizing are pressure-bonded in the Z-axis direction while being stretched in the X-Y plane. Therefore, in each drawn region 106, the thickness between the first and second internal electrodes 112 and 113 is gradually reduced from the capacitance forming region 105 side toward the cutting line Ly. As a result, the drawn region 106 is formed such that the entire drawn region 106 including the first and second internal electrodes 112 and 113 sinks deeply inward in the Z-axis direction at the vicinity of the cutting line Ly.

2.3 Step S03: Cutting

Figure 8:
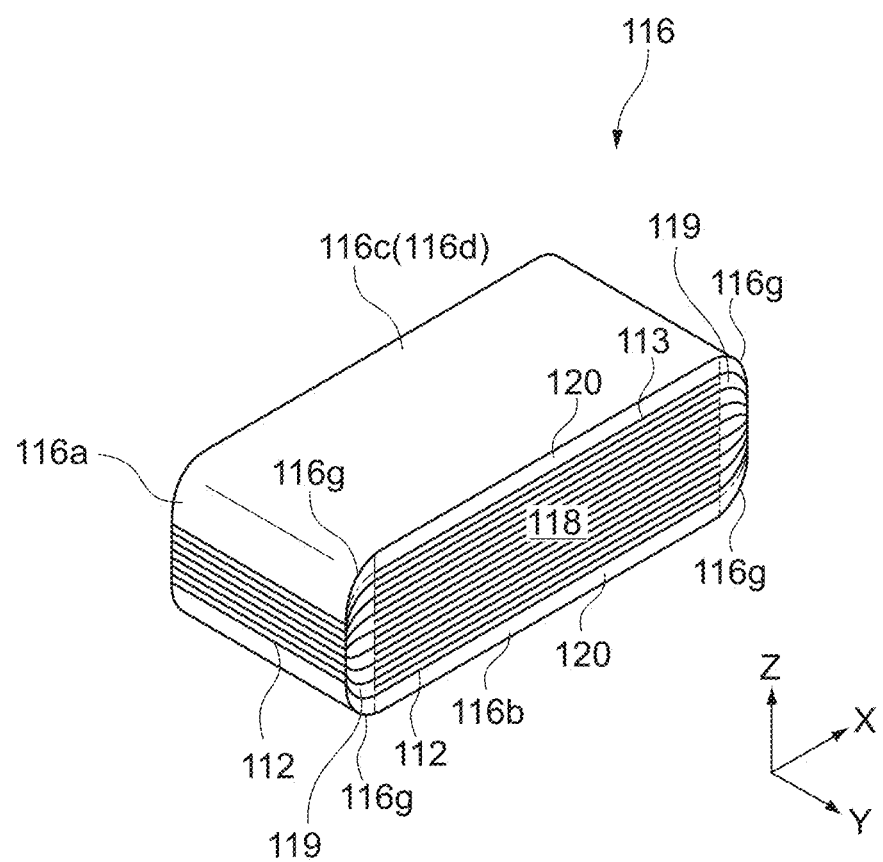
FIG. 8 is a perspective view showing a production process of the multi-layer ceramic capacitor.

In Step S03, the multi-layer sheet 104 pressure-bonded in Step S02 is cut along the cutting lines Lx and Ly, to produce an unsintered multi-layer chip 116 shown in FIG. 8. The multi-layer chip 116 corresponds to the multi-layer unit 16 after sintering. For cutting of the pressure-bonded multi-layer sheet 104, for example, a push-cutting blade or a rotary blade can be used.

As shown in FIG. 8, the multi-layer chip 116 includes an unsintered capacitance forming unit 118 corresponding to the capacitance forming unit 18, unsintered drawn portions 119 corresponding to the drawn portions 19, and unsintered covers 120 corresponding to the covers 20. The capacitance forming unit 118 includes the first and second internal electrodes 112 and 113 alternately laminated between the green sheets corresponding to the ceramic layers. Meanwhile, each drawn portion 119 includes the first internal electrodes 112 or the second internal electrodes 113 laminated with the green sheets therebetween.

Further, the multi-layer chip 116 includes two end surfaces 116a facing each other in the X-axis direction, two side surfaces 116b facing each other in the Y-axis direction, and two main surfaces 116c facing each other in the Z-axis direction.

The end surfaces 116a and the side surfaces 116b correspond to the cut surfaces in the cutting process and are configured as substantially flat surfaces.

The main surfaces 116c are formed in the pressure-bonding process of Step S02 by pressurizing the outermost third ceramic sheets 103 forming the unsintered covers 120 in the Z-axis direction. In each of the main surfaces 116c, a flat region 116d corresponding to the capacitance forming region 105 is formed.

Further, outside the flat region 116d of the main surface 116c, a curved surface that is curved inward in the Z-axis direction is formed so as to correspond to the drawn region 106 formed in the pressure-bonding process of Step S02. Therefore, the side surface 116b of the multi-layer chip 116 includes rounded corner portions 116g resulting from those curved surfaces and is thus configured to have a rectangular shape with rounded corners.

2.4 Step S04: Formation of Side Margins

In Step S04, unsintered side margins 117 are provided to the side surfaces 116b, at which the first and second internal electrodes 112 and 113 are exposed, of the multi-layer chip 116 produced in Step S03. Hereinafter, description will be given on the process of forming the side margins 117 in Step S05 with reference to FIGS. 9 to 11.

Figure 9:
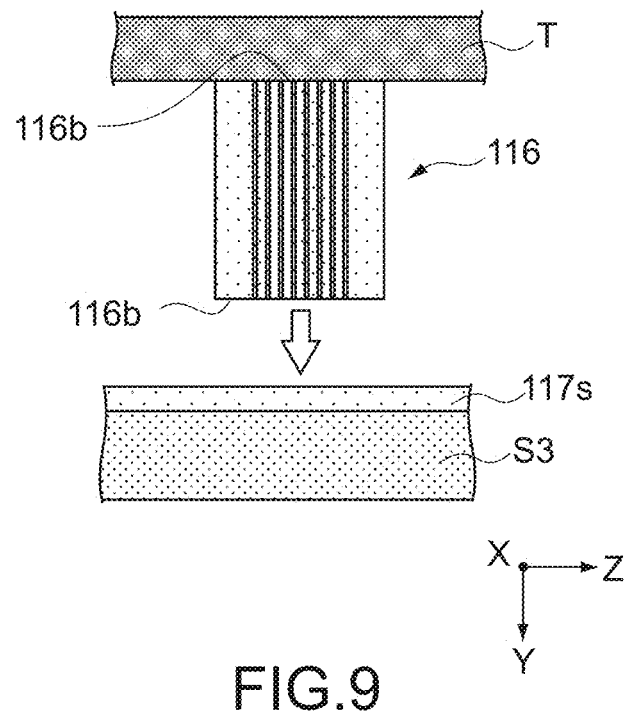
FIG. 9 is a cross-sectional view showing a production process of the multi-layer ceramic capacitor.

First, as shown in FIG. 9, a ceramic sheet 117s is disposed on a flat plate-like base member S3 made of an elastic body, and one side surface 116b of the multi-layer chip 116, the other side surface 116b of which is held with a tape T, is caused to face the ceramic sheet 117s.

Figure 10:
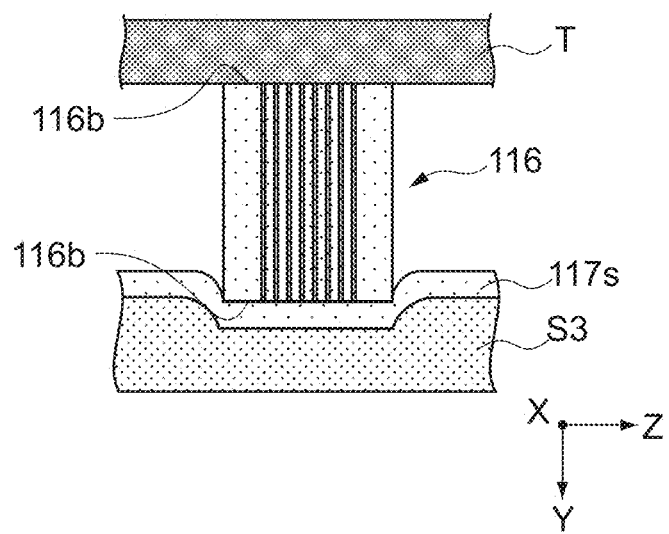
FIG. 10 is a cross-sectional view showing a production process of the multi-layer ceramic capacitor.
Figure 11:
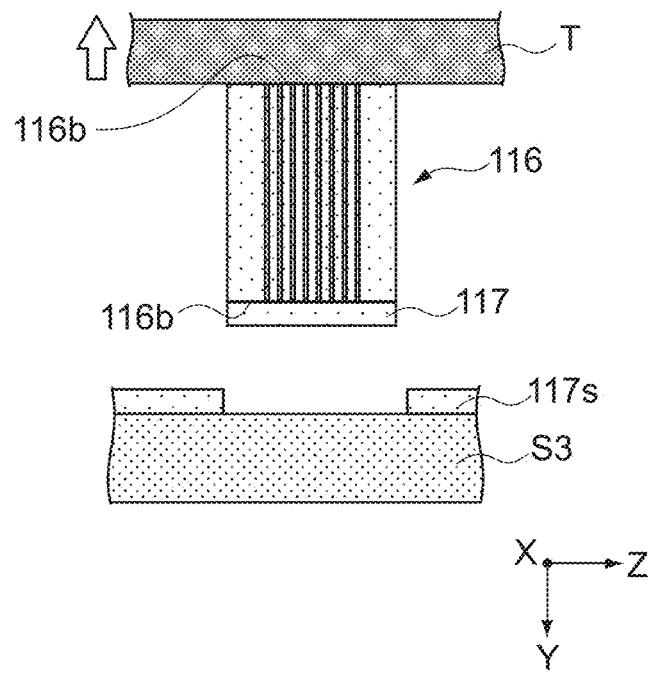
FIG. 11 is a cross-sectional view showing a production process of the multi-layer ceramic capacitor.

Next, as shown in FIG. 10, the ceramic sheet 117s is pressed by the side surface 116b of the multi-layer chip 116 in the Y-axis direction. The multi-layer chip 116 locally sinks deep into the base member S3 together with the ceramic sheet 117s. At that time, a shear force acts on the ceramic sheet 117s along the outer edge of the side surface 116b. When the shear force has shear strength equal to or larger than that of the ceramic sheet 117s, the ceramic sheet 117s is punched. With this configuration, as shown in FIG. 11, the portion of the ceramic sheet 117s, which sinks together with the multi-layer chip 116, is cut off as the side margin 117.

Figure 12:
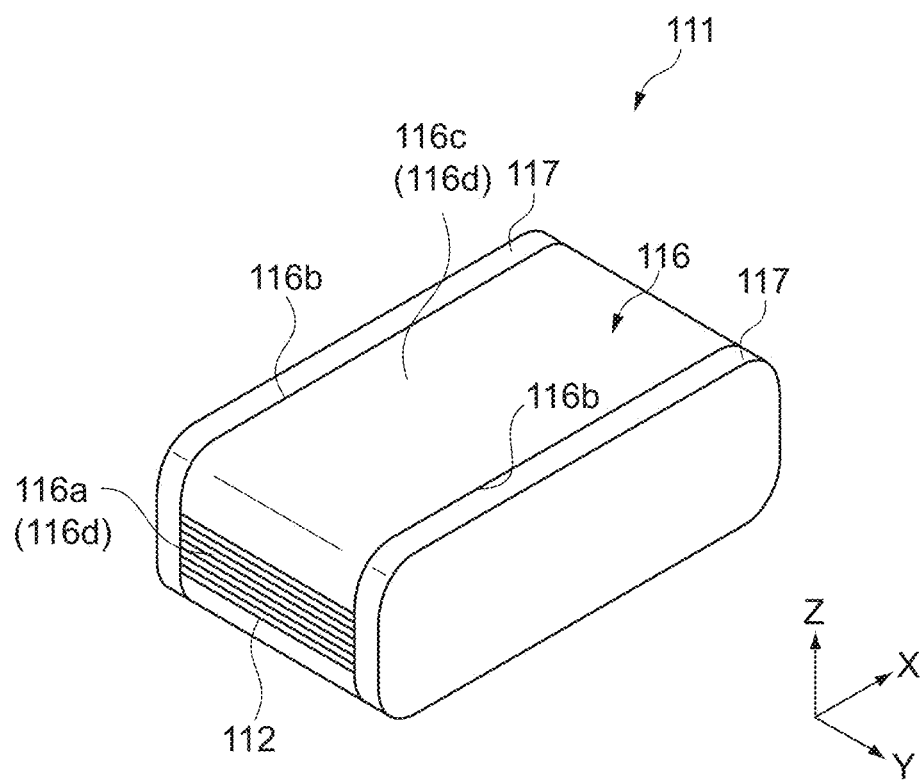
FIG. 12 is a perspective view showing a production process of the multi-layer ceramic capacitor.

FIG. 12 is a view showing an unsintered ceramic body 111 in which the unsintered side margins 117 are formed on the multi-layer chip 116. The side margins 117 are provided to only the side surfaces 116b and each have a planar shape corresponding to the shape of the side surface 116b.

2.5 Step S05: Sintering

In Step S05, the unsintered ceramic body 111 obtained in Step S04 is sintered, to produce the ceramic body 11 of the multi-layer ceramic capacitor 10 shown in FIGS. 1 to 3. A sintering temperature in Step S05 can be determined on the basis of a sintering temperature of the ceramic body 111. Further, sintering can be performed in a reduction atmosphere or a low-oxygen partial pressure atmosphere, for example.

2.6 Step S06: Formation of External Electrode

In Step S06, the first external electrode 14 and the second external electrode 15 are formed in both end portions in the X-axis direction of the ceramic body 11 obtained in Step S05. A method of forming the first external electrode 14 and the second external electrode 15 in Step S06 can be optionally selected from well-known methods. Accordingly, the multi-layer ceramic capacitor 10 as shown in FIGS. 1 to 3 is formed.

It should be noted that part of the processing in Step S06 described above may be performed before Step S05. For example, before Step S05, the unsintered electrode material may be applied to both the end surfaces of the unsintered ceramic body 111 that face in the X-axis direction, and in Step S05, the unsintered ceramic body 111 may be sintered and, simultaneously, the unsintered electrode material may be baked to form the base films of the first external electrode 14 and the second external electrode 15. Alternatively, the unsintered electrode material may be applied to the ceramic body 111 that has been subjected to debinder processing, to simultaneously sinter the unsintered electrode material and the ceramic body 111.

By the above steps, the multi-layer ceramic capacitor 10 is completed. In this production method, the side margins 17 are provided to the side surfaces 16b, at which the first and second internal electrodes 12 and 13 are exposed, of the multi-layer unit 16 in a later step. Thus, the positions of the end portions of the first and second internal electrodes 12 and 13 in the Y-axis direction in the ceramic body 11 are aligned with one another along the Z-axis direction with variations of 0.5 μm or less.

Further, in the side surface 16b of the multi-layer unit 16 after sintering, corner portions 163 corresponding to the rounded corner portions 116g formed in the side surface 116b of the unsintered multi-layer chip 116 are formed. Hereinafter, the shape of the side surface 16b will be described.

3. Detailed Configuration of Side Surface 16b of Multi-Layer Unit 16

Figure 13:
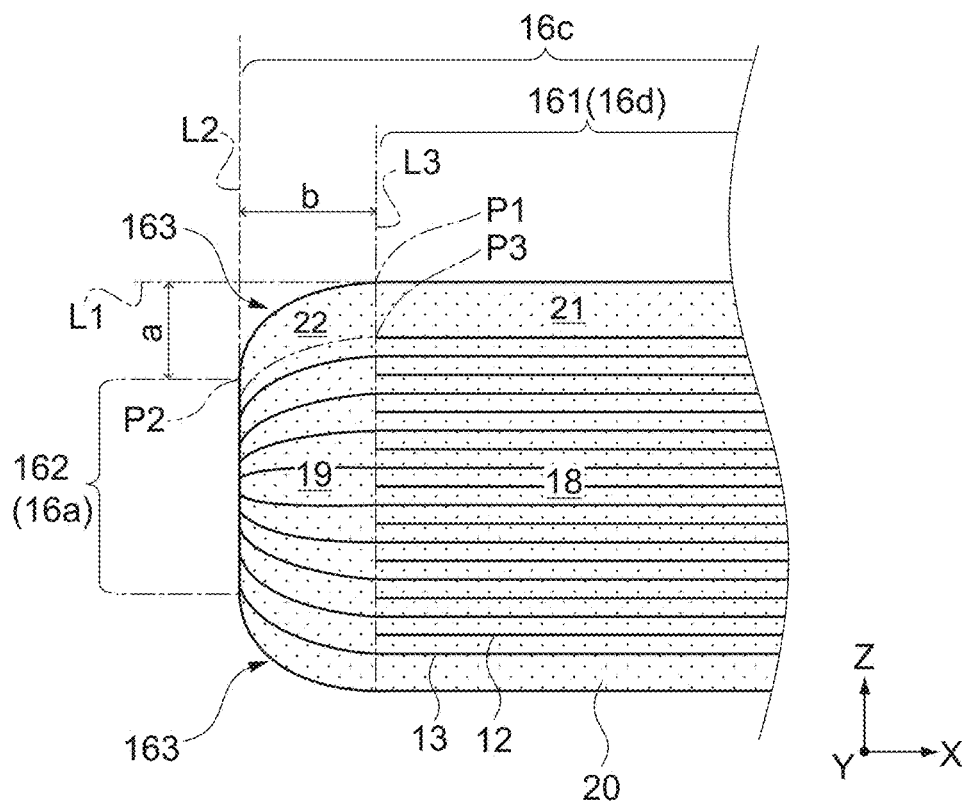
FIG. 13 is a partially enlarged view of FIG. 2.

FIG. 13 is a partial cross-sectional view of the multi-layer unit 16 of FIG. 2 and is also a partially enlarged view of part of the side surface 16b of the multi-layer unit 16.

The side surface 16b is configured to have a substantially rectangular shape with rounded corners in plan view in the Y-axis direction. In other words, the side surface 16b includes two first straight portions 161 configured by the respective outer edges of the two main surfaces 16c, two second straight portions 162 configured by the respective outer edges of the two end surfaces 16a, and four curved corner portions 163 that connect the first straight portions 161 and the second straight portions 162. The two first straight portions 161 face each other in the Z-axis direction, and the two second straight portions 162 face each other in the X-axis direction.

The side surface 16b is configured to be almost linearly symmetrical with the Z-axis direction and the X-axis direction. Thus, the configuration of one of the corner portions 163 and the configurations of the first straight portion 161 and the second straight portion 162 connected to the corner portion 163 will be hereinafter described in detail.

The first straight portion 161 is a straight portion extending in the X-axis direction and is configured by the flat region 16d of the main surface 16c. In other words, the first straight portion 161 corresponds to the flat region 116d, which is formed by the pressure-bonding process of Step S02, and is formed in the first cover region 21 that covers the capacitance forming unit 18.

It should be noted that the first straight portion 161 only needs to be substantially straight and may be, for example, meandering or curved in the Z-axis direction within a small range of 1% of the height dimension of the ceramic body 11 in the Z-axis direction.

An endpoint P1 of the first straight portion 161 is positioned at a peripheral portion of the first cover region 21 in the X-axis direction. Here, in the pressure-bonding process of Step S02, the load concentrates on the capacitance forming region 105, and the first, second, and third ceramic sheets 101, 102, and 103 are stretched from the capacitance forming region 105 toward the drawn regions 106. Accordingly, the compressibility at the peripheral portion of the capacitance forming region 105 in the X-axis direction may become higher than at the center portion thereof. Therefore, the endpoint P1 is positioned at the same position as the boundary of the drawn portion 19 with the capacitance forming unit 18 in the X-axis direction (i.e., end portion P3 to be described later) or positioned on the capacitance forming unit 18 side relative to the end portion P3 of the drawn portion 19.

The second straight portion 162 extends in the Z-axis direction and is configured by the outer edge of the end surface 16a as a flat surface. Accordingly, an endpoint P2 of the second straight portion 162 is positioned at an end portion of the end surface 16a in the Z-axis direction.

It should be noted that the second straight portion 162 only needs to be substantially straight and may be, for example, meandering or curved in the X-axis direction within a small range of 0.5% of the length dimension of the ceramic body 11 in the X-axis direction.

The corner portion 163 is a curved portion that connects the endpoint P1 of the first straight portion 161 and the endpoint P2 of the second straight portion 162 and corresponds to the corner portion 116g of the unsintered side surface 116b as described above. The corner portion 163 is configured by the outer edge of the main surface 116c in the Y-axis direction at the peripheral portion thereof in the X-axis direction and is formed by the second cover region 22 that mainly covers the drawn portion 19.

The shape of the corner portion 163 is defined by a ratio of the following "a" and "b" and values thereof "a" is a value corresponding to the height dimension of the corner portion 163 along the Z-axis direction, and "b" is a value corresponding to the length dimension of the corner portion 163 along the X-axis direction. With this configuration, a favorable shape of the corner portion 163 is specified.

More specifically, "a" is assumed as a distance along the Z-axis direction between a first imaginary line L1 extended from the first straight portion 161 and the endpoint P2 of the second straight portion 162 on the first imaginary line L1 side. The value of "a" increases as the compressibility of the drawn region 106 formed in the pressure-bonding process of Step S02 becomes larger. Accordingly, the value of "a" can be adjusted by at least one of the number of lamination of the first and second ceramic sheets 101 and 102 or the thickness of each of the first and second ceramic sheets 101 and 102.

Further, "b" is assumed as a distance along the X-axis direction between a second imaginary line L2 extended from the second straight portion 162 and the end portion P3. The end portion P3 is an end portion of the drawn portion 19, which is exposed at the side surface 16b, and is positioned at the boundary between the capacitance forming unit 18 and the cover 20. The value of "b" can be adjusted by a dimension of the drawn portion 19 in the X-axis direction.

In actuality, since it is difficult to control the position of the endpoint P1 of the first straight portion 161 in the X-axis direction, the length dimension of the corner portion 163 along the X-axis direction from the endpoint P1 to the second imaginary line L2 and the value of "b" may not coincide with each other. However, the second cover region 22 on the drawn portion 19 is reliably curved inward in the Z-axis direction to constitute the corner portion 163. Thus, in this embodiment, in order to specify the length dimension of the corner portion 163 in the X-axis direction, "b" corresponding to the length dimension in the X-axis direction in the outermost layer of the drawn portion 19 in the Z-axis direction is assumed to be used.

The corner portion 163 is curved so as to satisfy the following conditions where $0.4 \leq a/b \leq 2.5$, and $10 \ \mu m \leq a$, $b \leq 60 \ \mu m$. This makes it possible to favorably punch the ceramic sheet 117s in Step S04 and provide the side margin 117 having an appropriate shape, which is formed on only the side surface 16b.

Hereinafter, actions and effects of the corner portion 163 will be described by using Comparative example.

Figure 14:
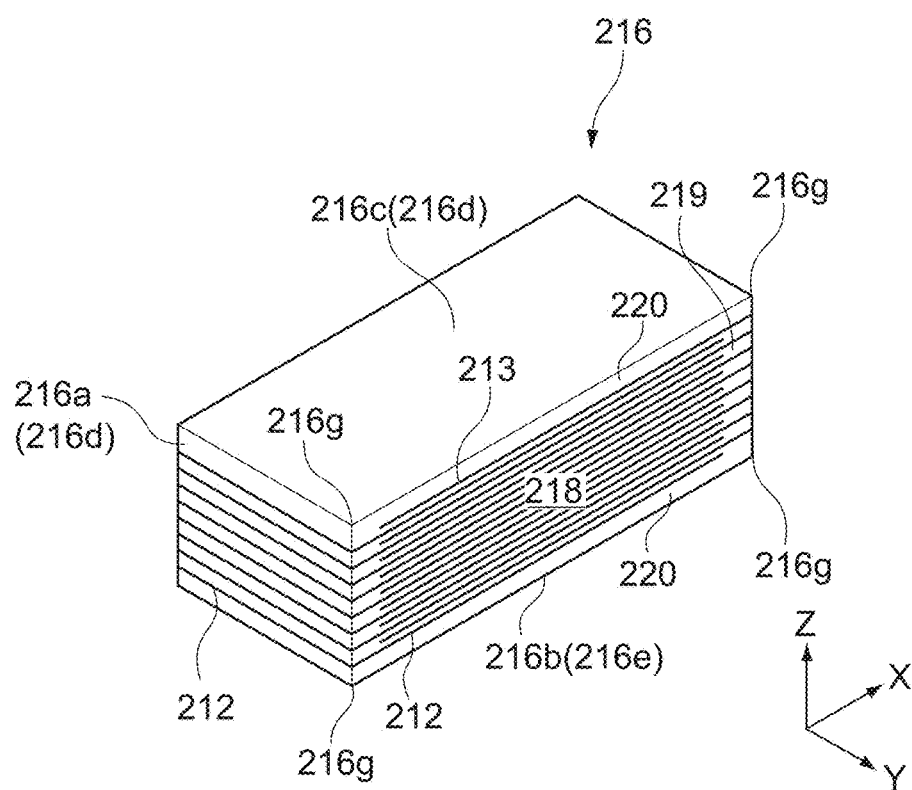
FIG. 14 is a perspective view of an unsintered multi-layer chip according to Comparative example of this embodiment.

FIG. 14 is a perspective view of an unsintered multi-layer chip 216 according to Comparative example of this embodiment.

The multi-layer chip 216 includes, as with the case of the multi-layer chip 116, an unsintered capacitance forming unit 218 including laminated internal electrodes 212 and 213, two drawn portions 219 in each of which the internal electrodes 212 or 213 are drawn, and unsintered covers 220. The multi-layer chip 216 includes, as with the case of the multi-layer chip 116, two end surfaces 216a facing each other in the X-axis direction, two side surfaces 216b facing each other in the Y-axis direction, and two main surfaces 216c facing each other in the Z-axis direction.

The multi-layer chip 216 is configured such that the entire main surface 216c is almost flat. Thus, corner portions 216g of the side surface 216b are formed to be sharper than the corner portions 116g. In other words, each of the corner portions 216g of the side surface 216b after sintering satisfies at least one of the condition where $0.4 \leq a/b$ or the condition where $10 \ \mu m > a$, and does not satisfy the conditions where $0.4 \leq a/b \leq 2.5$ and $10 \ \mu m \leq a$, $b \leq 60 \ \mu m$.

Such a multi-layer chip 216 is formed by, for example, printing a ceramic paste in the electrode non-formation regions N1 and N2 of the first and second ceramic sheets 101 and 102. This causes each thickness of the first and second ceramic sheets 101 and 102 in the Z-axis direction to be made uniform in the plane and to be made almost uniform also in the multi-layer sheet in which the first and second ceramic sheets 101 and 102 are laminated. Therefore, also in the pressure-bonding process of Step S02, the drawn regions are hardly curved, and the multi-layer chip 216 having a square shape is produced.

In the process of forming side margins 217 of the multi-layer chip 216, first, as in the case of the multi-layer chip 116 of FIG. 9, the side surface 216b of the multi-layer chip 216 is caused to face the ceramic sheet 117s. Next, as in FIG. 10, the ceramic sheet 117s is pressed by the side surface 216b of the multi-layer chip 216.

Figure 15:
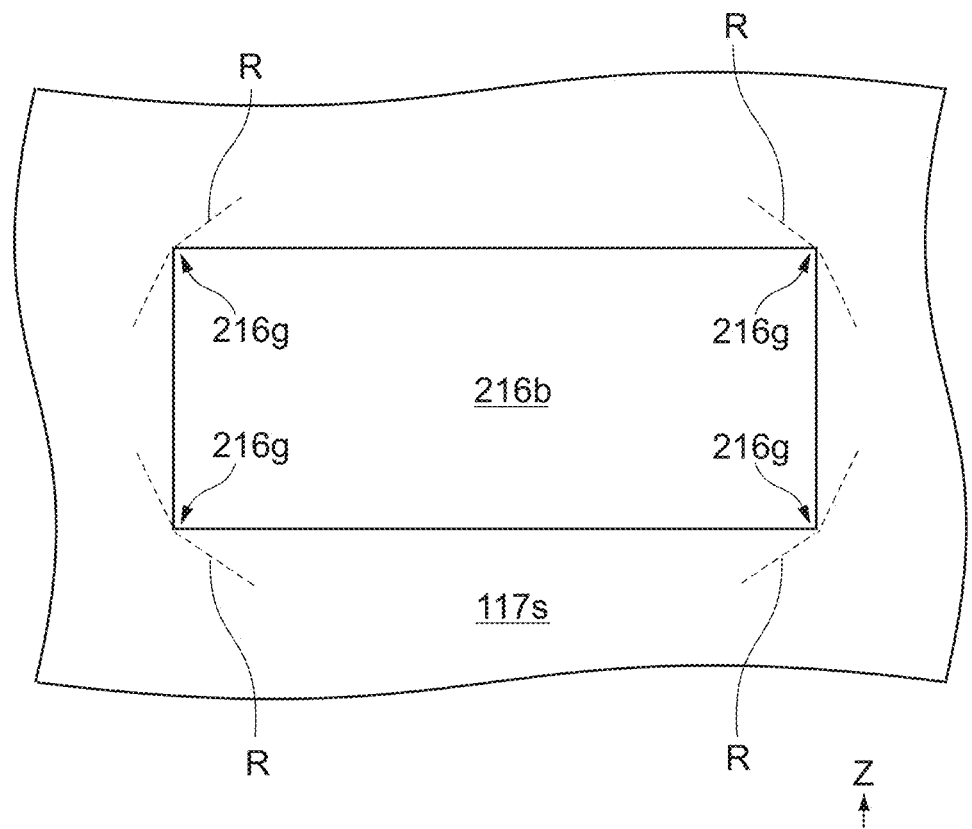
FIG. 15 is a plan view showing a production process of the multi-layer ceramic capacitor according to Comparative example described above.

FIG. 15 is a schematic plan view showing a state where the ceramic sheet 117s is pressed by the side surface 216b of the multi-layer chip 216 when viewed in the Y-axis direction. It should be noted that FIG. 15 omits the illustration of the tape T and the first and second internal electrodes 112 and 113 shown in FIGS. 9 to 11.

The corner portions 216g of the side surface 216b are sharp as described above. Thus, a shear force that acts by the outer edges of the substantially flat main surfaces 216c and a shear force that acts by the substantially flat end surfaces 216a are both applied to the vicinity of the corner portions 216g of the ceramic sheet 117s. In other words, the shear force along the Z-axis direction and the shear force along the X-axis direction concentrate in the vicinity of the corner portions 216g on the ceramic sheet 117s. As a result, strong shear stress is generated in the vicinity of the corner portions 216g on the ceramic sheet 117s, and cracks R are generated in the ceramic sheet 117s.

Figure 16:
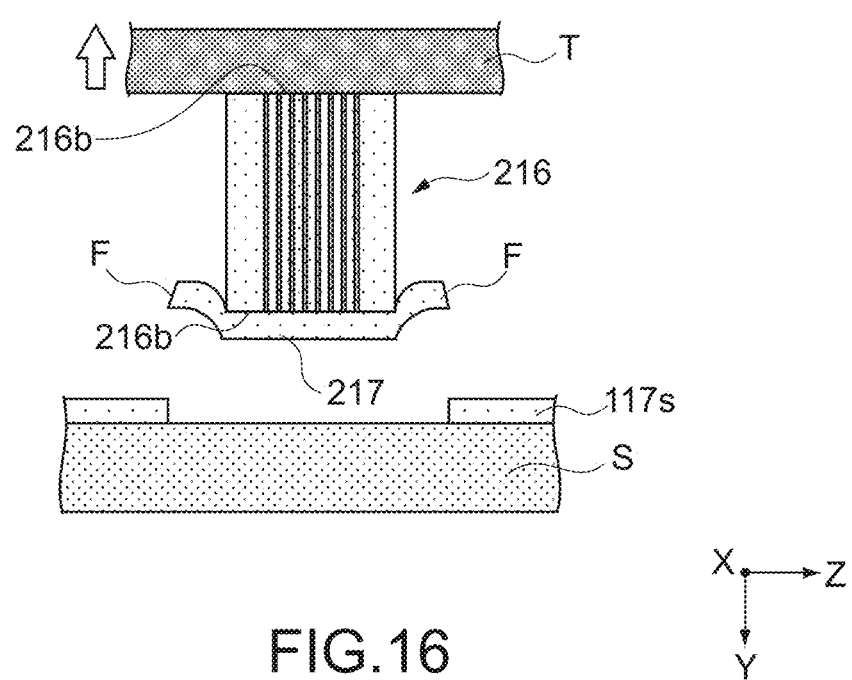
FIG. 16 is a cross-sectional view showing a production process of the multi-layer ceramic capacitor according to Comparative example described above.

Therefore, as shown in FIG. 16, when the ceramic sheet 117s is punched by the side surface 216b, the ceramic sheet 117s tears due to the cracks R, and a side margin 217 with fragments F is formed.

Figure 17:
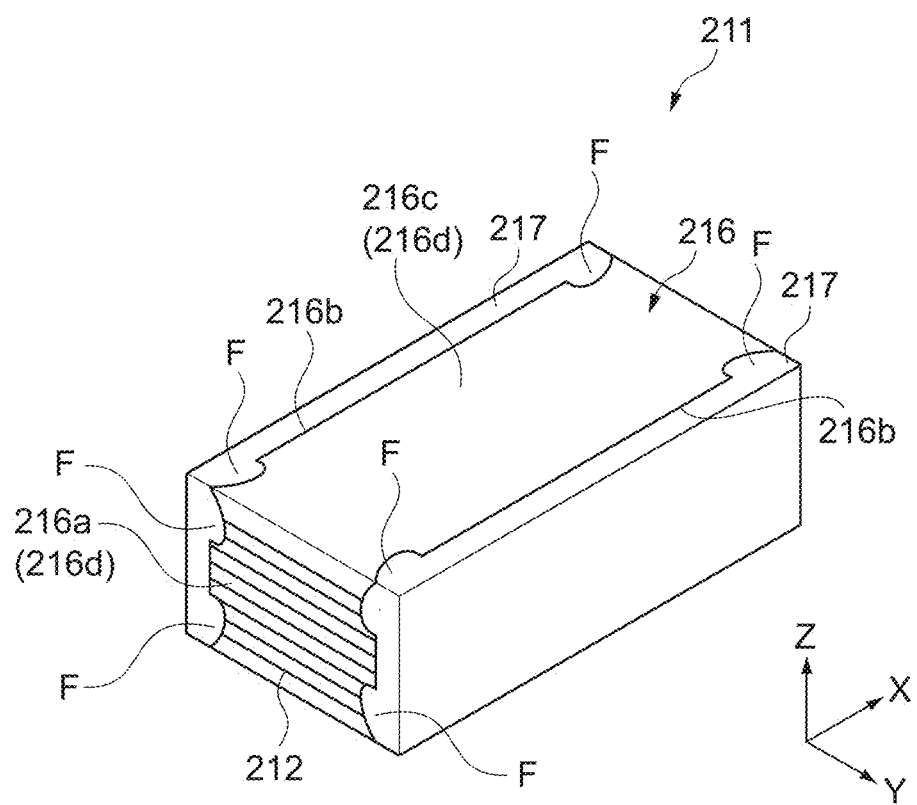
FIG. 17 is a perspective view of an unsintered ceramic body according to Comparative example described above.

As a result, as shown in FIG. 17, an unsintered ceramic body 211 is formed, in which the fragments F extending from the side margin 217 are attached to the end surfaces 216a and the main surface 216c other than the side surfaces 216b. The fragments F cause defects in appearance of the multi-layer ceramic capacitor and reduce a yield rate.

In this regard, in the multi-layer ceramic capacitor 10, the unsintered corner portions 116g are formed to be largely curved such that each corner portion 163 of the side surface 16b after sintering satisfies the conditions where $0.4 \leq a/b$, and $10 \ \mu m \leq a$. Thus, in the process of forming the side margins 117 in Step S04, the shear force along the outer edges of the corner portions 116g can be caused to act on the ceramic sheet 117s. As a result, the load to be applied to the ceramic sheet 117s can be dispersed, and the ceramic sheet 117s can be inhibited from being torn. Therefore, it is possible to punch the ceramic sheet 117s into a shape along the outer edge of the side surface 116b and to inhibit appearance defects of the multi-layer ceramic capacitor 10 from occurring.

Meanwhile, when the corner portion of the side surface of the multi-layer unit satisfies the condition where a, $b > 60 \ \mu m$, the proportion of the corner portion in the side surface increases, and the corner portion is more largely curved. In this case, in the process of forming the side margins, a shear force that acts on the ceramic sheet is reduced by the side surface, which makes it difficult to punch the ceramic sheet.

Also when the corner portion satisfies the condition where a/b>2.5, similarly, the corner portion may be more largely curved inward in the Z-axis direction, and punching defects in the ceramic sheet may occur. Further, in this case, the vicinity of the endpoint of the first straight portion may have a square shape. With this configuration, a shear force may concentrate on the ceramic sheet in the vicinity of the endpoint of the first straight portion, and the appearance defects similar to those of the ceramic body 211 of FIG. 17 may occur.

From the above, when the corner portion 163 of the side surface 16b after sintering satisfies the conditions where a/b≤2.5, and a, b≤60 µm in the multi-layer ceramic capacitor 10, the unsintered side surface 116b can exert a sufficient shear force on the ceramic sheet 117s. Therefore, the punching defects of the ceramic sheet 117s can be inhibited from occurring.

Further, when the corner portion 163 of the side surface 16b after sintering satisfies the condition where 10 µm≤b, the length dimension of the drawn portion 19 along the X-axis direction can be sufficiently ensured, and a dielectric voltage in the end margin can be sufficiently ensured. Moreover, the displacement of the lamination of the first and second ceramic sheets 101 and 102 in the multi-layer sheet 104 can suppress electrical conduction between the first external electrode 14 and the second internal electrodes 13 and between the second external electrode 15 and the first internal electrodes 12. Therefore, a short circuit in each drawn portion 19 can be inhibited from occurring.

In conclusion, when the multi-layer ceramic capacitor 10 is produced such that the corner portion 163 of the side surface 16b satisfies the conditions where 0.4≤a/b≤2.5, and 10 µm≤a, b≤60 µm, the side margin 17 having an appropriate shape can be formed, and the reliability of the multi-layer ceramic capacitor 10 can be sufficiently ensured. This can increase the yield rate of the multi-layer ceramic capacitor 10.

Moreover, when the corner portion 163 satisfies the condition where 0.5≤a/b≤1.5, the appearance defects can be more reliably inhibited from occurring, and the yield rate of the multi-layer ceramic capacitor 10 can further be increased.

In addition, in order to increase the capacitance of the multi-layer ceramic capacitor 10 without changing the size of the ceramic body 11, it is only necessary to increase the intersectional area of the first and second internal electrodes 12 and 13 and shorten the length dimension of the drawn portion 19 along the X-axis direction. For example, the corner portion 163 can be designed to satisfy the condition where 10 µm≤b≤30 µm, while also considering the insulation properties in the end margin.

In this case, when the corner portion 163 further satisfies the condition where 1.0≤a/b≤1.5, an appropriate shear force can be exerted on the ceramic sheet 117s even if the corner portion 163 is small. This can achieve a multi-layer ceramic capacitor 10 that is small, has a large capacitance, and includes side margins each having an appropriate shape.

4. Examples and Comparative Examples

As Examples and Comparative examples of this embodiment, samples of the multi-layer ceramic capacitor 10, the multi-layer units of which have variously-shaped side surfaces, were produced, and the occurrence of defects when the side margins were formed was investigated. In those samples, the dimension in the X-axis direction was set to 1.0 mm, and the dimensions in the Y-axis direction and the Z-axis direction were set to 0.5 mm.

Table 1 shows the values of "a" and "b" of the corner portion of the side surface and the value of "a/b" calculated from those values, which were measured for the samples in each of Examples and Comparative examples of the multi-layer ceramic capacitors. It should be noted that each value of Table 1 is a mean value of 100 samples in each of Examples and Comparative examples.

TABLE 1

|  | Distance between first imaginary line and endpoint of second straight portion (µm): a | Distance between second imaginary line and endpoint of drawn portion (µm): b | a/b | Number of samples with punching defects | Number of samples with appearance defects |
|---|---|---|---|---|---|
| Example1 | 43 | 19 | 2.26 | 0/100 | 2/100 |
| Example2 | 44 | 24 | 1.83 | 0/100 | 1/100 |
| Example3 | 42 | 29 | 1.45 | 0/100 | 0/100 |
| Example4 | 30 | 28 | 1.07 | 0/100 | 0/100 |
| Example5 | 42 | 50 | 0.84 | 0/100 | 0/100 |
| Example6 | 37 | 51 | 0.73 | 0/100 | 0/100 |
| Example7 | 31 | 52 | 0.60 | 0/100 | 0/100 |
| Example8 | 28 | 49 | 0.57 | 0/100 | 0/100 |
| Example9 | 25 | 48 | 0.52 | 0/100 | 0/100 |
| Example10 | 20 | 46 | 0.43 | 0/100 | 1/100 |
| Example11 | 18 | 45 | 0.40 | 0/100 | 2/100 |
| Comparative example1 | 9 | 38 | 0.24 | 0/100 | 10/100 |
| Comparative example2 | 9 | 21 | 0.43 | 0/100 | 9/100 |
| Comparative example3 | 61 | 62 | 0.98 | 30/100 | 0/70 |
| Comparative example4 | 61 | 21 | 2.90 | 5/100 | 9/95 |

"a" is a value corresponding to the height dimension of the corner portion along the Z-axis direction. In other words, as shown in FIG. 13, "a" is a distance along the Z-axis direction between the first imaginary line (L1) extended from the first straight portion (161) of the side surface (16b) along the X-axis direction and the endpoint (P2) of the second straight portion (162) of the side surface (16b) along the Z-axis direction on the first imaginary line (L1) side.

"b" is a value corresponding to the length dimension of the corner portion along the X-axis direction. In other words, as shown in FIG. 13, "b" is a distance along the X-axis direction between the second imaginary line (L2) extended from the second straight portion (162) and the end portion (P3). The end portion (P3) is an end portion of the drawn portion (19) and is positioned at the boundary between the capacitance forming unit (18) and the cover (20).

As shown in Table 1, each corner portion of the samples of Examples 1 to 11 satisfied the conditions where 0.4≤a/b≤2.5, and 10 μm≤a, b≤60 μm.

Meanwhile, in all of the samples of Comparative examples 1 and 2, "a" was 9 μm, which did not satisfy the condition where 10 μm≤a.

Moreover, in the samples of Comparative example 1, "a/b" was 0.24, which did not satisfy the condition where 0.4≤a/b.

In the samples of Comparative example 3, "a" was 61 μm, and "b" was 62 μm, which did not satisfy the condition where a≤60 μm.

In the samples of Comparative example 4, "a" was 61 μm, and "a/b" was 2.90, which did not satisfy the conditions where a≤60 μm, and a/b≤2.5.

For those samples of Examples 1 to 11 and Comparative examples 1 to 4, the number of samples with punching defects in a ceramic sheet for forming side margins was investigated. The punching defects in this case mean that all or part of the ceramic sheet is difficult to punch when the side margins are formed, and thus it is difficult to form the side margins on the side surfaces.

In Examples 1 to 11 in which the corner portion satisfies the conditions where 0.4≤a/b≤2.5, and 10 μm≤a, b≤60 μm, the punching defects did not occur.

Meanwhile, in Comparative example 3 in which the values of "a" and "b" are larger than 60 μm, significantly many punching defects were generated in 30 samples in the 100 samples. As a result, it was confirmed that if the corner portion does not satisfy the condition where a, b≤60 μm, the punching defects are generated and this makes it difficult to appropriately provide the side margins, even when the corner portion satisfies the condition where 0.4≤a/b≤2.5.

Moreover, in Comparative example 4 in which "a/b" is larger than 2.5, the punching defects were generated in 5 samples in the 100 samples. As a result, it was confirmed that if the corner portion has "a/b" larger than 2.5, a shear force to be exerted on the ceramic sheet become unstable, and this makes it difficult to appropriately provide the side margins.

Subsequently, for the samples that did not have the punching defects in the samples of Examples 1 to 11 and Comparative examples 1 to 4, the number of samples with appearance defects was investigated. The appearance defects were caused when the fragments of the ceramic sheet for forming the side margins adhered to portions other than the side surfaces of the multi-layer unit. Specifically, the number of samples with appearance defects was investigated for the 100 samples in each of Examples 1 to 11 and Comparative examples 1 and 2, the 70 samples in Comparative example 3, and the 95 samples in Comparative example 4.

In Comparative examples 1 and 2 in which the value of "a" is less than 10 μm, the appearance defects were generated in 9 or 10 samples in the 100 samples. Further, also in Comparative example 4 in which the value of "a" is larger than 60 μm and the value of "a/b" is larger than 2.5, the appearance defects were generated in 9 samples in the 95 samples that did not have the punching defects.

Meanwhile, in each of Examples 1 to 11, the number of samples that had the appearance defects were two or less in the 100 samples, and the yield rate was favorable. For example, even in Example 11 in which the value of "a/b" is 0.40 and in Example 1 in which the value of "a/b" is 2.26, the number of samples having the appearance defects were two. It should be noted that, also in the 70 samples having no punching defects in Comparative example 3, no samples had appearance defects.

As a result, it was confirmed that, when the corner portion satisfies the conditions where 10 μm≤a, and 0.4≤a/b≤2.5, the appearance defects caused when the ceramic sheet for forming the side margins sticks out of the side surface can be inhibited from occurring.

Actually, when the shape of the side surface of each sample of Examples 1 to 11 and the shape of the side surface of each sample of Comparative examples 1, 2, and 4 in which the appearance defects occurred were compared with each other, the corner portions of Examples 1 to 11 were rounder, whereas the corner portions of Comparative examples 1, 2, and 4 were sharper. As a result, it is thought that when the corner portion satisfies the condition where 0.4≤a/b≤2.5, the concentration of the shear force in the vicinity of the corner portions on the ceramic sheet can be suppressed.

Moreover, in Examples 3 to 9 in which the value of "a/b" of the corner portion is 0.52 (Example 9) or more and 1.45 (Example 3) or less, the appearance defects did not occur in all of the 100 samples. Accordingly, it was confirmed that also when the corner portion satisfies the condition where 0.5≤a/b≤1.5, the appearance defects can be more reliably inhibited from occurring.

In addition, in Examples 3 to 9 in which the appearance defects did not occur, in Example 3 in which the value of "b" is 29 μm, the value of "a/b" was 1.45, whereas in Example 4 in which the value of "b" is 28 μm, the value of "a/b" was 1.07. Accordingly, it was confirmed that also when the length dimension of the drawn portion is reduced so as to satisfy the condition where 10 μm≤b≤30 μm, if the corner portion is designed to satisfy the condition where 1.0≤a/b≤1.5, the appearance defects can be inhibited from occurring. In other words, when the corner portion satisfies the conditions where 10 μm≤b≤30 μm, and 1.0≤a/b≤1.5, it is possible to enlarge the intersectional area of the internal electrodes and achieve increase in capacitance while improving the yield rate.

Further, in the multi-layer ceramic capacitor in which the length dimension of the drawn portion (end margin) is less than 10 μm, a short circuit due to the displacement of lamination and a short circuit due to the insufficient dielectric voltage occurred, and the reliability of the multi-layer ceramic capacitor could not be sufficiently ensured. Thus, it was confirmed that when the value of "b" corresponding to the length dimension of the drawn portion is set to 10 μm or more, the reliability of the multi-layer ceramic capacitor can be ensured.

Hereinabove, it was confirmed that when the corner portion satisfies the conditions where 0.4≤a/b≤2.5, and 10 μm≤a, b≤60 μm, the occurrence of defects such as the punching defects and appearance defects caused when the side margins are formed can be suppressed.

5. Other Embodiments

Hereinabove, the embodiment of the present disclosure has been described, but the present disclosure is not limited to the embodiment described above, and it should be appreciated that the present disclosure may be variously modified without departing from the gist of the present disclosure.

The method of producing the multi-layer ceramic capacitor 10 is not limited to the above production method as long as the corner portion 163 having the shape described above can be formed on the side surface 16b of the multi-layer unit 16.

Moreover, in the multi-layer ceramic capacitor 10, the capacitance forming unit 18 may be divided into a plurality of capacitance forming units 18 and then disposed in the Z-axis direction. In this case, in each capacitance forming unit 18, the first and second internal electrodes 12 and 13 only need to be alternately disposed along the Z-axis direction, and the first internal electrodes 12 or the second internal electrodes 13 may be consecutively disposed at portions where the capacitance forming units 18 are adjacent to each other.

What is claimed is:

1. A multi-layer ceramic capacitor, comprising:
   a multi-layer unit including
      a capacitance forming unit that includes internal electrodes laminated in a first direction,
      a drawn portion that extends from the capacitance forming unit in a second direction orthogonal to the first direction, the internal electrodes being drawn in the drawn portion, and
      a cover that covers the capacitance forming unit and the drawn portion in the first direction,
   the multi-layer unit having a main surface facing in the first direction, an end surface facing in the second direction, and a side surface facing in a third direction orthogonal to the first direction and the second direction; and
   a side margin provided to the side surface,
   the side surface including
      a first straight portion that includes an outer edge of the main surface and extends in the second direction,
      a second straight portion that includes an outer edge of the end surface and extends in the first direction, and
      a corner portion that connects the first straight portion and the second straight portion with each other, the corner portion being curved to satisfy conditions where $0.4 \leq a/b \leq 2.5$, and $10\ \mu m \leq a$, $b \leq 60\ \mu m$, where a represents a distance along the first direction between a first imaginary line extended from the first straight portion in the second direction and an endpoint of the second straight portion on a side of the first imaginary line, and b represents a distance along the second direction between a second imaginary line extended from the second straight portion in the first direction and an end portion of the drawn portion, the end portion being exposed from the side surface and positioned at a boundary between the capacitance forming unit and the cover.

2. The multi-layer ceramic capacitor according to claim 1, wherein
   the corner portion is curved to further satisfy a condition where $0.5 \leq a/b \leq 1.5$.

3. The multi-layer ceramic capacitor according to claim 1, wherein
   the corner portion is curved to further satisfy conditions where $1.0 \leq a/b \leq 1.5$, and $10\ \mu m \leq b \leq 30\ \mu m$.

* * * * *